US012738154B2

(12) United States Patent
Tin

(10) Patent No.: US 12,738,154 B2
(45) Date of Patent: Sep. 15, 2026

(54) CONTINUOUS-VARIABLE (CV) QUANTUM STATE-BASED VEHICLE CONDITION PREDICTION METHOD, VEHICLE CONDITION PREDICTION SYSTEM, AND NON-TRANSITORY COMPUTER-READABLE RECORDING MEDIUM

(71) Applicant: Wistron Corporation, New Taipei City (TW)

(72) Inventor: Hsiao-Wen Tin, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 134 days.

(21) Appl. No.: 18/776,724

(22) Filed: Jul. 18, 2024

(65) Prior Publication Data

US 2025/0329253 A1 Oct. 23, 2025

(30) Foreign Application Priority Data

Apr. 22, 2024 (TW) ................................ 113114994

(51) Int. Cl.

| | |
|---|---|
| ***G08G 1/01*** | (2006.01) |
| ***B60W 50/00*** | (2006.01) |
| ***G06F 17/16*** | (2006.01) |
| ***G08G 1/00*** | (2006.01) |
| ***G08G 1/052*** | (2006.01) |

(52) U.S. Cl.

CPC ....... *G08G 1/0125* (2013.01); *B60W 50/0097* (2013.01); *G06F 17/16* (2013.01); *G08G 1/0112* (2013.01); *G08G 1/052* (2013.01); *G08G 1/20* (2013.01); *B60W 2556/65* (2020.02); *B60W 2756/10* (2020.02)

(58) Field of Classification Search

CPC ......... B60W 2556/65; B60W 2756/10; B60W 50/0097; G06F 17/16; G08G 1/0112; G08G 1/0125; G08G 1/0141; G08G 1/052; G08G 1/20

See application file for complete search history.

(56) References Cited

U.S. PATENT DOCUMENTS

2006/0262930 A1 11/2006 Dinu et al.
2020/0218261 A1* 7/2020 Zidek .................. G05D 1/0088
(Continued)

OTHER PUBLICATIONS

Ghori, M.R., et al.; "Vehicular Ad-hoc Network (VANET): Review;" 2018 IEEE International Conference on Innovative Research and Development (ICIRD); May 2018; pp. 1-6.
(Continued)

*Primary Examiner* — Jerrod Irvin Davis
(74) *Attorney, Agent, or Firm* — McClure, Qualey & Rodack, LLP

(57) ABSTRACT

A continuous-variable (CV) quantum state-based vehicle condition prediction method includes: constructing a data matrix of vehicle conditions based on travel information of a plurality of vehicles; and converting each data matrix into quantum information represented by a CV quantum state. Herein, the travel information is described by the CV quantum state. In this way, change-point detection is performed during high-speed and changing information transmission, and abruptness of data serves as the basis for subsequent transmission and processing rules. Therefore, vehicle-to-vehicle (V2V) transmission capabilities are improved.

19 Claims, 8 Drawing Sheets

(56) References Cited

U.S. PATENT DOCUMENTS

| | | | |
|---|---|---|---|
| 2021/0001857 | A1 | 1/2021 | Nishitani et al. |
| 2022/0092035 | A1 | 3/2022 | Ganesh et al. |

OTHER PUBLICATIONS

Chakraborty, S., et al.; "Quantum Image Processing—Challenges and Future Research Issues;" pp. 1-19.

Ruan, Y., et al.; "Quantum Image Processing: Opportunities and Challenges;" Mathematical Problems in Engineering; Jan. 2021; pp. 1-8.

Johnson, R.A., et al.; "Applied Multivariate Statistical Analysis;" 2007; pp. 1-393.

Examination report dated Feb. 25, 2025, listed in related Taiwan patent application No. 113114994.

Baek, H., et al.; "Fast Quantum Convolutional Neural Networks for Low-Complexity Object Detection in Autonomous Driving Applications;" .arXiv.Dec. 28, 2023,.https://arxiv. org/abs/2401.01370; Dec. 2023; Abstract, p. 2.

* cited by examiner

Tb1

| Sampling time / Data source | Ts1 | Ts2 | ........ | Tsm |
|---|---|---|---|---|
| 10a | Rv (Rv1~Rvx) | Rv (Rv1~Rvx) | ........ | Rv (Rv1~Rvx) |
| 10b-1 | Rv (Rv1~Rvx) | Rv (Rv1~Rvx) | ........ | Rv (Rv1~Rvx) |
| 10b-2 | Rv (Rv1~Rvx) | Rv (Rv1~Rvx) | ........ | Rv (Rv1~Rvx) |
| ⋮ | ⋮ | ⋮ | ⋱ | ⋮ |
| 10b-n | Rv (Rv1~Rvx) | Rv (Rv1~Rvx) | Rv (Rv1~Rvx) | Rv (Rv1~Rvx) |

| Travel parameter / Neighbor vehicle | Vehicle identity | Rv-1 | ........ | Rv-T |
| --- | --- | --- | --- | --- |
| #1 | ID-1 | Rv-11 | ........ | Rv-T1 |
| #2 | ID-2 | Rv-12 | ........ | Rv-T2 |
| ⋮ | ⋮ | ⋮ | ⋱ | ⋮ |
| #S | ID-S | Rv-1S | ........ | Rv-TS |

| Travel parameter / Neighbor vehicle | Vehicle identity | Rvh |
| --- | --- | --- |
| #1 | ID-1 | Rvh-1 |
| #2 | ID-2 | Rvh-2 |
| #3 | ⋮ | ⋮ |
| #S | ID-S | Rvh-S |

FIG. 7

CONTINUOUS-VARIABLE (CV) QUANTUM STATE-BASED VEHICLE CONDITION PREDICTION METHOD, VEHICLE CONDITION PREDICTION SYSTEM, AND NON-TRANSITORY COMPUTER-READABLE RECORDING MEDIUM

CROSS-REFERENCE TO RELATED APPLICATION

This non-provisional application claims priority under 35 U.S.C. § 119(a) to Patent Application No. 113114994 filed in Taiwan, R.O.C. on Apr. 22, 2024, the entire contents of which are hereby incorporated by reference.

BACKGROUND

Technical Field

The present disclosure relates to a vehicle-to-vehicle (V2V) communication-based in-vehicle solution, and in particular, to a continuous-variable (CV) quantum state-based vehicle condition prediction method, a vehicle condition prediction system, and a non-transitory computer-readable recording medium.

Related Art

With the rapid development of communication and computing technologies, an autonomous driving technology has become a research hotspot for automakers around the world. To ensure a smooth travel of an autonomous vehicle on a road, a set of network communication platform capable of allowing the vehicle to receive a traffic signal and other important information in time is required.

A vehicular ad-hoc network (VANET) is a wireless network including a mobile node (MN) and a road-side unit (RSU). The MN is a vehicle. The vehicle is provided with a sensor and an on board unit (OBU). The sensor is configured to sense various travel parameters. The OBU is configured to process the travel parameters and share data accordingly. The RSU is an apparatus that is fixedly mounted, and may be use as a gateway for communication between the MN and a server or the Internet. There are two communication modes in the VANET, that is, V2V communication and vehicle-to-infrastructure (V2I) communication. The autonomous vehicle obtains conditions and trends of neighbor vehicles and/or vehicles on the road through information exchange between V2V and V2I, to improve travel security. Compared with other wireless communication, the VANET has the characteristics of a frequently changing network topology and highly dynamic vehicle nodes. Therefore, reduction in information transmission efficiency of the VANET gradually becomes an important issue.

SUMMARY

In some embodiments, a CV quantum state-based vehicle condition prediction method includes: constructing, based on travel information of a plurality of vehicles, at least one data matrix that records vehicle conditions of the vehicles; and converting each data matrix into quantum information represented by a CV quantum state.

In some embodiments, the travel information of each vehicle includes at least one travel parameter of the corresponding vehicle, and each travel parameter is a speed of the vehicle, any coordinate data in positioning coordinates of the vehicle, a course of the vehicle, or chassis data of the vehicle.

In some embodiments, the above vehicle condition prediction method further includes: receiving the travel information of at least one surrounding vehicle in the vehicles through a VANET; and obtaining the travel information of a current vehicle in the vehicles by using at least one sensor, where the at least one sensor is mounted on the current vehicle.

In some embodiments, the step of constructing, based on travel information of a plurality of vehicles, at least one data matrix that records vehicle conditions of the vehicles includes: integrating travel parameters of the vehicles at a plurality of pieces of sampling time based on the travel information of the current vehicle and the travel information of the surrounding vehicle, to accordingly form a data matrix for a neighbor vehicle at different sampling time.

In some embodiments, the step of converting each data matrix into quantum information represented by a CV quantum state includes: performing normalization on the data matrix to obtain an eigenvector; and mapping the eigenvector into the CV quantum state to obtain the quantum information.

In some embodiments, the normalization may be linear function normalization or zero-mean normalization.

In some embodiments, the travel information of each vehicle includes at least one travel parameter of the corresponding vehicle. Each data matrix is constructed by using original values of a same travel parameter of the plurality of vehicles. The step of performing normalization on the data matrix to obtain an eigenvector includes: determining a value range of the travel parameter; linearly mapping the plurality of original values into a specified range based on the value range, to obtain a plurality of normalized values; and forming the eigenvector by using the plurality of normalized values.

In some embodiments, the quantum information is a probability distribution function of a variable obtained without considering quantum properties of superposition and entanglement.

In some embodiments, the probability distribution function of the variable is $$|\varphi\rangle = \int_{-\infty}^{\infty} P(x_{i,j})\,|x_{i,j}\rangle dx_{i,j},$$

where $|\varphi\rangle$ represents the quantum information in the CV quantum state, $x_{i,j}$ represents a normalized value of the travel parameter of an $i^{th}$ vehicle in the plurality of vehicles at $j^{th}$ sampling time in the plurality of pieces of sampling time, $P(x_{i,j})$ represents a probability distribution function of $x_{i,j}$, $|x_{i,j}\rangle$ represents a quantum state of $x_{i,j}$, i is a positive integer, j is a positive real number, and the probability distribution function of $x_{i,j}$ is $$P(x_{i,j}) = \frac{1}{\sqrt{\pi\sigma^2}}\exp\left(-\frac{(x_{i,j}-\mu)^2}{2\sigma^2}\right).$$

In some embodiments, the travel information of each vehicle includes at least one travel parameter of the corresponding vehicle. Each data matrix is constructed by using original values of a same travel parameter of the plurality of vehicles. The step of converting each data matrix into quantum information represented by a CV quantum state includes: mapping each original value in the data matrix into the CV quantum state to obtain the quantum information. The quantum information may be a probability distribution function of a variable obtained without considering quantum properties of superposition and entanglement.

In some embodiments, the probability distribution function of the variable is $$|\varphi\rangle = \int_{-\infty}^{\infty} P(x_{i,j})\,|\,x_{i,j}\rangle dx_{i,j},$$

where $|\varphi\rangle$ represents the quantum information in the CV quantum state, $x_{i,j}$ represents an original value of the travel parameter of an $i^{th}$ vehicle in the plurality of vehicles at $j^{th}$ sampling time in at least one piece of sampling time, $P(x_{i,j})$ represents a probability distribution function of $x_{i,j}$, $|x_{i,j}\rangle$ represents a quantum state of $x_{i,j}$, i is a positive integer, j is a positive real number, and the probability distribution function of $x_{i,j}$ is $$P(x_{i,j}) = \frac{1}{\sqrt{\pi\sigma^2}}\exp\left(-\frac{(x_{i,j}-\mu)^2}{2\sigma^2}\right).$$

In some embodiments, the vehicle condition prediction method further includes: performing change-point detection on all quantum information; and generating a corresponding response signal based on each change point obtained through the change-point detection.

In some embodiments, the step of performing change-point detection on all quantum information includes: calculating a posterior probability of the quantum information at each piece of sampling time by using a Bayesian method; and determining, based on a prior probability and the posterior probability, a change point representing abruptness.

In some embodiments, the quantum information is segmented into a plurality of data segments for the change-point detection, and a size of each data segment is determined by a vehicle density.

In some embodiments, the prior probability is a specified value, and the specified value is determined by a past posterior probability.

In some embodiments, the travel information of each surrounding vehicle is carried in a V2V message.

In some embodiments, a non-transitory computer-readable recording medium stores at least one program, such that an OBU loads and executes the program to implement the above CV quantum state-based vehicle condition prediction method.

In some embodiments, a vehicle condition prediction system includes a processor, where the processor is configured to construct, based on travel information of a plurality of vehicles, at least one data matrix that records vehicle conditions of the vehicles, and convert each data matrix into quantum information represented by a CV quantum state.

In some embodiments, the vehicle condition prediction system further includes a wireless transceiver and at least one sensor. The wireless transceiver and each sensor are connected to the processor. The wireless transceiver is configured to perform wireless communication with at least one surrounding vehicle through a VANET. Each sensor is configured to sense the travel information of a current vehicle. The processor is further configured to receive the travel information of the surrounding vehicle by using the wireless transceiver, and obtain the travel information of the current vehicle by using the sensor.

BRIEF DESCRIPTION OF THE DRAWINGS

FIG. 5 is a schematic diagram of travel data according to an embodiment.

FIG. 6 is a schematic diagram of a vehicle neighbor table according to an embodiment.

FIG. 7 is a schematic diagram of a vehicle neighbor table according to another embodiment.

DETAILED DESCRIPTION

Figure 1:
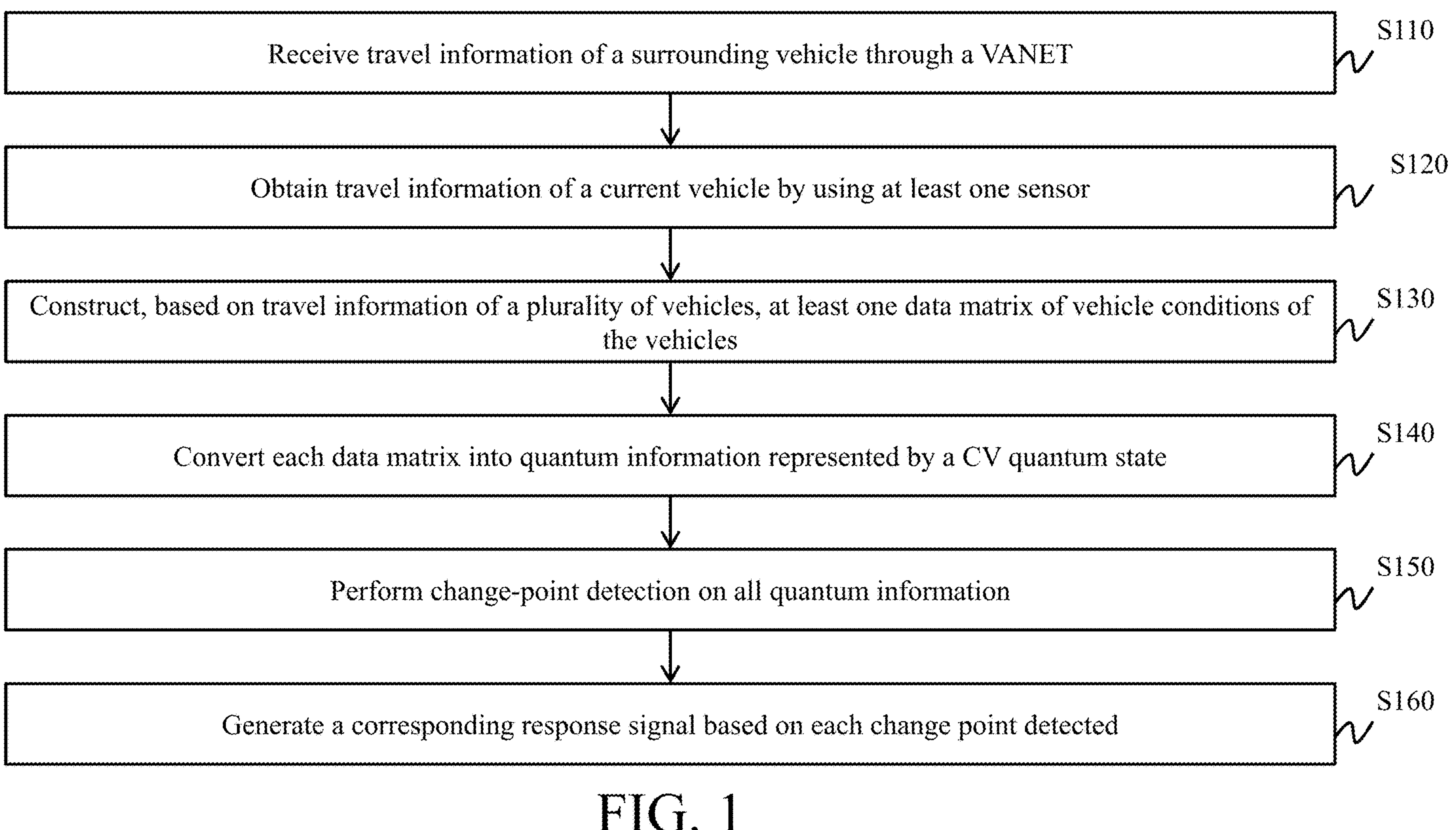
FIG. 1 is a flowchart of a CV quantum state-based vehicle condition prediction method according to an embodiment.
Figure 2:
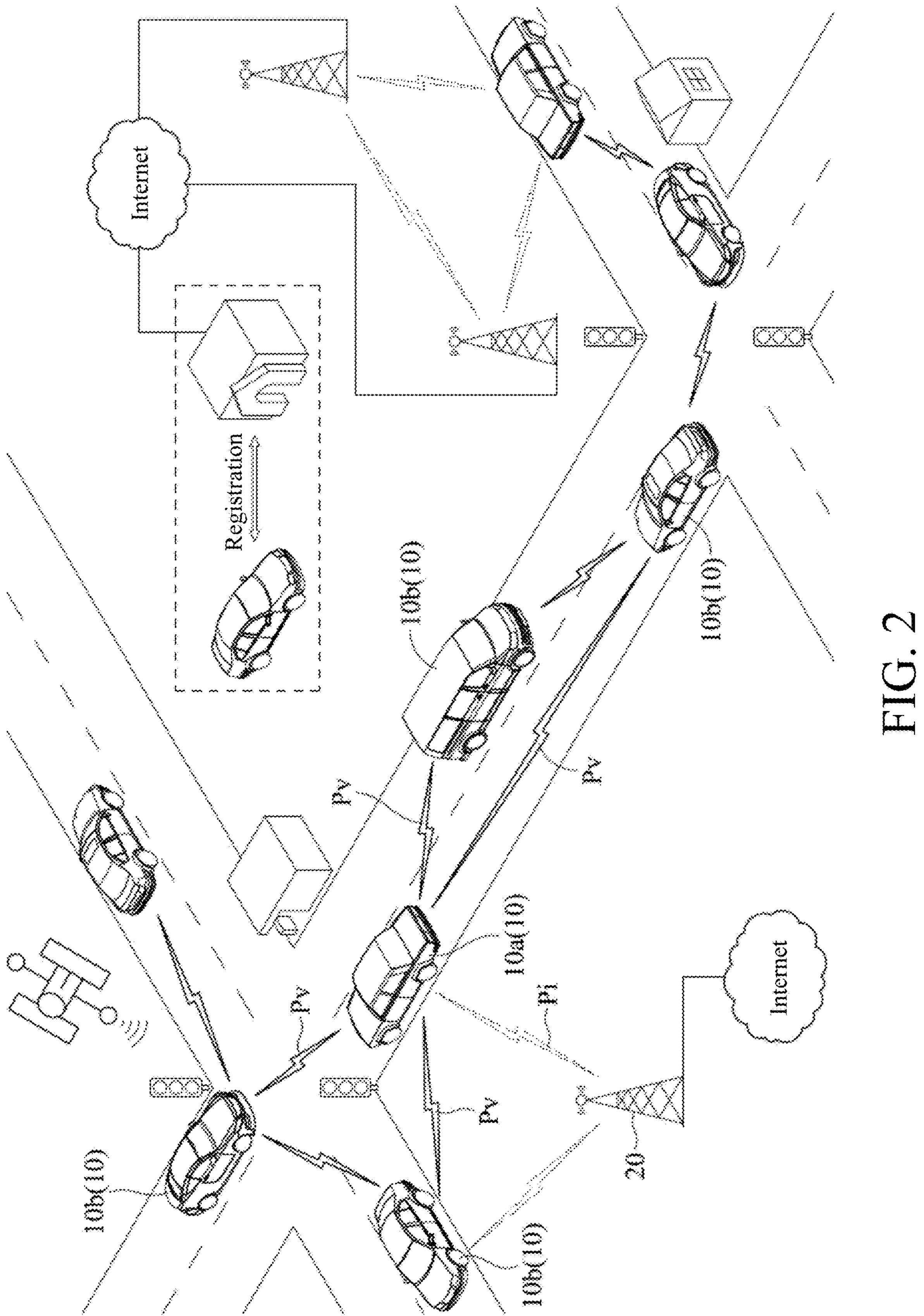
FIG. 2 is a schematic diagram of an example in which the vehicle condition prediction method in FIG. 1 is used.
Figure 3:
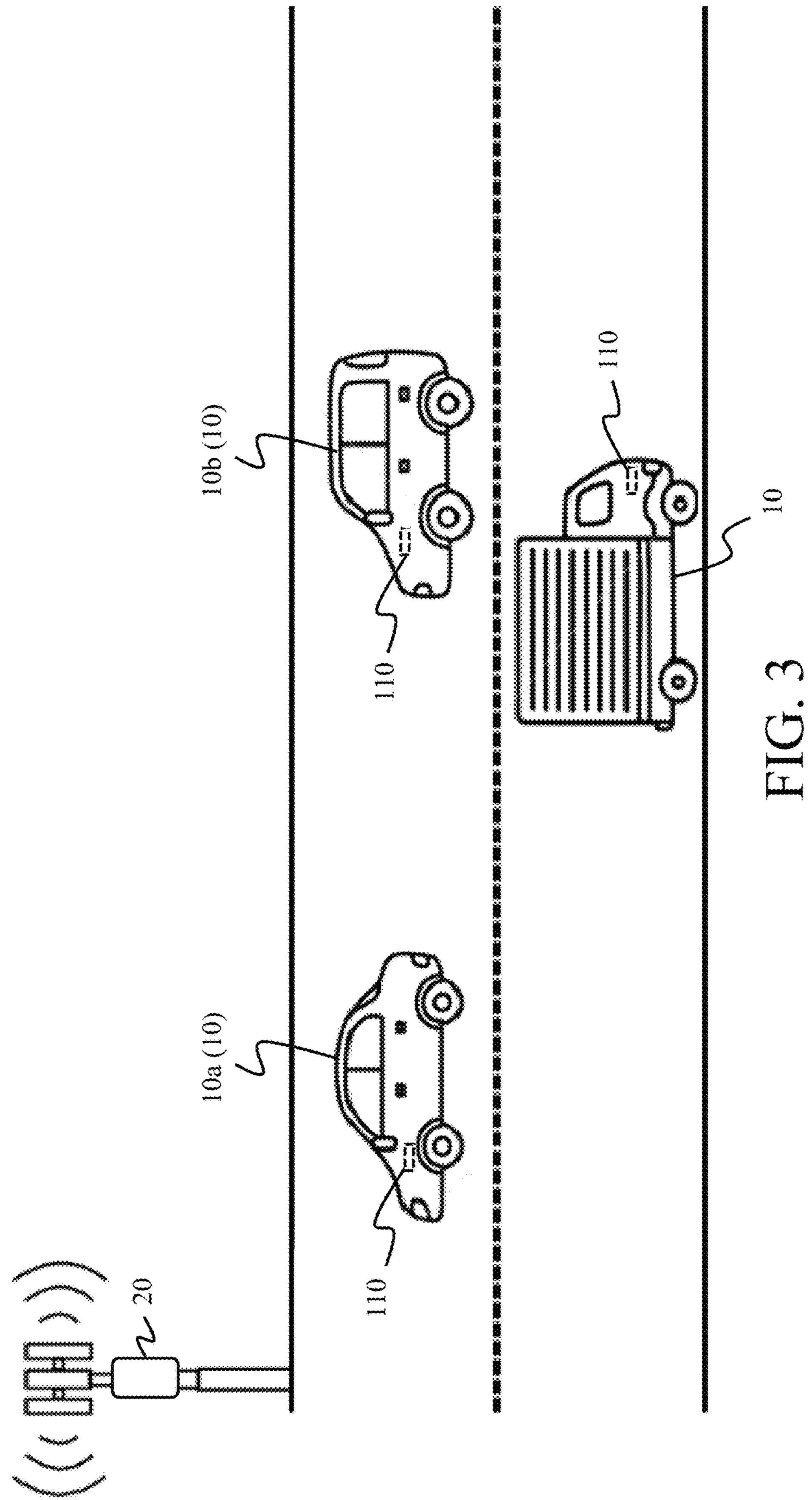
FIG. 3 is a schematic diagram of another example in which the vehicle condition prediction method in FIG. 1 is used.
Figure 4:
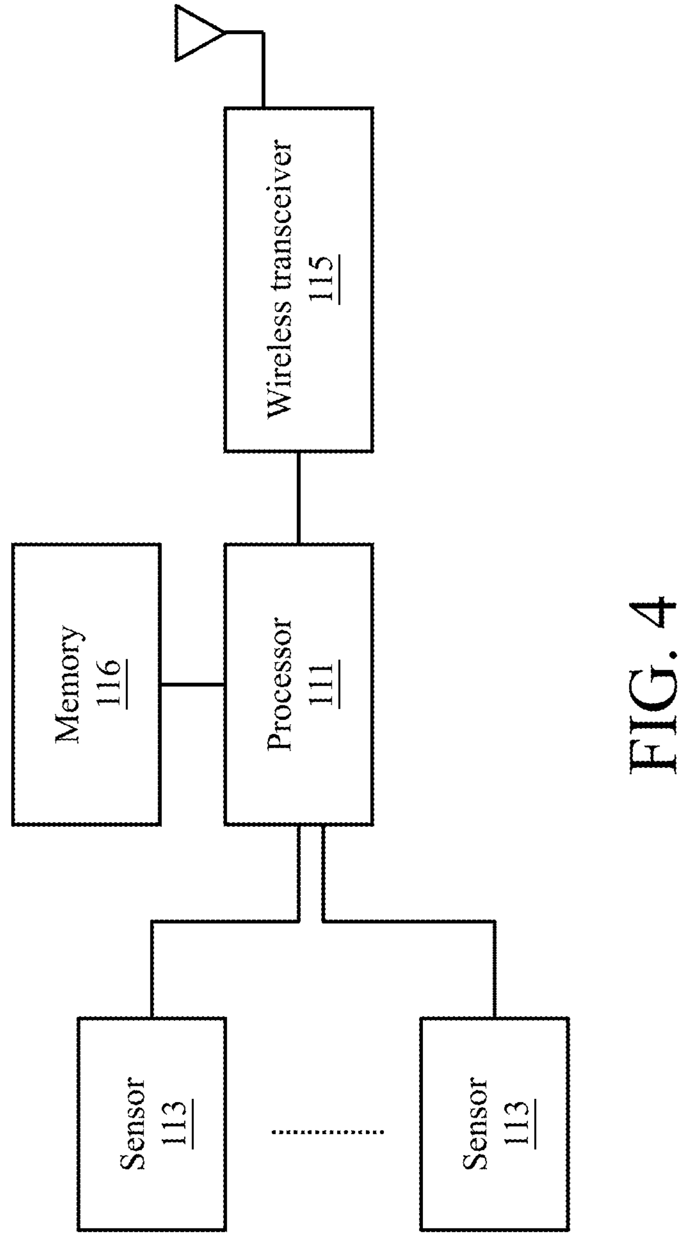
FIG. 4 is a block diagram of functions of an OBU according to an embodiment.

Refer to FIG. 1 and FIG. 2. A continuous-variable (CV) quantum state-based vehicle condition prediction method is applied to a vehicle 10 (hereinafter referred to as a current vehicle 10*a*). Specifically, the CV quantum state-based vehicle condition prediction method may be implemented by an OBU 110 (as shown in FIG. 3) mounted on the vehicle 10 by running corresponding software or application program. The following gives detailed descriptions with the OBU 110 as an example.

After the current vehicle 10*a* is started, the current vehicle 10*a* may form a VANET with a vehicle 10 around (hereinafter referred to as a surrounding vehicle 10*b*) and/or an RSU 20 fixedly arranged by the roadside. A principle and an architecture of the VANET are well known to a person skilled in the art, and thus details are not described again.

Refer to FIG. 1, FIG. 2, and FIG. 3. When the current vehicle 10*a* runs, the current vehicle 10*a* may receive travel information Pv of the surrounding vehicle 10*b* through the VANET (step S110), and obtain travel information Pv of the current vehicle 10*a* by using a sensor 113 (step S120).

In the VANET, an OBU 110 of the current vehicle 10*a* may establish V2V communication with an OBU 110 of the surrounding vehicle 10*b*, to wirelessly exchange the travel information such as speeds, positioning coordinates, and courses. In other words, the travel information Pv is V2V data. In addition, the OBU 110 of the current vehicle 10*a* may further establish V2I communication with the RSU 20, to wirelessly obtain road information Pi such as a traffic signal, a traffic sign, and the number of obstacles. Therefore, the vehicle 10 configured with appropriate software and/or application program can use the travel information Pv of the surrounding vehicle 10*b* and/or the road information Pi to help avoid collisions, alleviate traffic congestions, improve environments, etc. In some embodiments, travel information Pv of each surrounding vehicle 10*b* is carried in a V2V message.

Specifically, refer to FIG. 1 to FIG. 4. In a running process, an OBU 110 of each vehicle 10 may repeatedly sense and obtain travel information Pv at current sampling time by using a sensor 113, then package the travel information Pv into a broadcast packet, and wirelessly transmit the broadcast packet through a wireless transceiver 115.

In some embodiments, the OBU 110 of each vehicle 10 may obtain positioning coordinates (for example, a longitude and a latitude) of a current position of the vehicle 10 by using the sensor 113 (for example, a positioning module). In addition, the OBU 110 of each vehicle 10 further obtains a current speed of the vehicle 10 by using the sensor 113 (for example, a speed sensor), and obtains a current course of the vehicle 10 by using the sensor 113 (for example, an accelerometer and a gyroscope). In some embodiments, the sensor 113 may be the positioning module, the speed sensor, a traction control system, a light switching sensor, the accelerometer, the gyroscope, a camera unit (for example, a camera), or the like. For example, the positioning module may be a global positioning system (GPS) module. In some embodiments, the sensor 113 may be built in the OBU 110 (as shown in FIG. 3). In some other embodiments, the sensor 113 may be located outside the OBU 110 (not shown in the figure). In other words, the sensor 113 is mounted on the vehicle 10, and the OBU 110 is externally connected to the sensor 113 on the vehicle 10 through a connector (not shown in the figure). In some still other embodiments, the OBU 110 supports a plurality of sensors 113, where one part of sensors 113 are built in the OBU 110, and the other part of the sensors are located outside the OBU 110 and externally electrically connected to the OBU 110.

After step S120, at least one data matrix that records vehicle conditions of a plurality of vehicles 10 is constructed based on travel information Pv of the vehicles 10 (step S130). Specifically, the OBU 110 of the current vehicle 10*a* may integrate travel parameters Rv1 to Rvx (generically referred to as Rv) of data sources (that is, the current vehicle 10*a* and surrounding vehicles 10*b*-1 to 10*b*-*n*) at a plurality of pieces of different consecutive sampling time Ts1 to Tsm based on the travel information Pv of the current vehicle 10*a* and the travel information Pv of the surrounding vehicle 10*b*, to obtain a data matrix Tb1 (as shown in FIG. 5) of the data sources at the sampling time Ts1 to Tsm, and accordingly form a data matrix Tb2 (as shown in FIG. 6) of neighbor vehicles #1 to #S at the different sampling time Ts1 to Tsm, where n, S, and x are all positive integers, m is a positive real number, and #1 to #S are selected from 10*b*-1 to 10*b*-*n*.

In some embodiments, the travel information Pv of each vehicle 10 includes one or more travel parameters Rv. In some examples, each travel parameter Rv may be a speed of the vehicle 10, positioning coordinates of the vehicle 10, a course of the vehicle 10, or chassis data of the vehicle 10. For example, the positioning coordinates of the vehicle 10 may be represented by a longitude and a latitude, and the travel parameter Rv is the longitude of a position of the vehicle 10 or the latitude of a position of the vehicle 10.

In some embodiments, each data matrix Tb2 records one or more travel parameters Rv1 to Rv-T that are of the surrounding vehicles 10*b*-1 to 10*b*-*n* (that is, the neighbor vehicles #1 to #S) neighboring to the current vehicle 10*a* and that are obtained at specific sampling time (for example, Tsj), where j is a positive real number, j is any one of 1 to m, T is a positive integer, and Rv-1 to Rv-T are selected from Rv1 to Rvx. In some embodiments, the data matrix Tb2 may be a vehicle neighbor table, as shown in FIG. 6. The vehicle neighbor table records vehicle identities ID-1 and ID-2 to ID-S of the vehicles 10 and one or more travel parameters Rv-11 to Rv-1S, to Rv-T1 to Rv-TS obtained at the specific sampling time Tsj.

In some examples, an example in which there are n+1 vehicles 10 (including the current vehicle 10*a* and the surrounding vehicles 10*b*-1 to 10*b*-*n*) and m pieces of sampling time is used. The OBU 110 integrates travel information Pv of the n+1 vehicles 10 at the m pieces of sampling time Ts1 to Tsm. The travel information Pv of each vehicle 10 at each of the sampling time Ts1 to Tsm is considered as a CV, and an m×(n+1) data matrix Tb1 is constructed. Each element ($x_{i,j}$) in the data matrix Tb1 represents travel information Pv of an $i^{th}$ vehicle 10 at $j^{th}$ sampling time (Tsj). Herein, a probability distribution of each element ($x_{i,j}$) may be represented by using a probability distribution function ($P(x_{i,j})$), where i is any one of 0 to n, and j is any one of 1 to m.

After step S130, the OBU 110 of the current vehicle 10*a* first converts each data matrix into quantum information represented by a CV quantum state (step S140). For example, the above example is used, and the OBU 110 represents in step S140 the probability distribution function obtained in step S130 in a form of a quantum state.

In some embodiments, each data matrix Tb2 is constructed by using original values of a same travel parameter in the travel parameters Rv1 to Rvx of the surrounding vehicles 10*b*-1 to 10*b*-*n* neighboring to the current vehicle 10*a*. In other words, for each of the travel parameters Rv1 to Rvx obtained at each of the sampling time Ts1 to Tsm, the OBU 110 may construct a data matrix Tb2, where the data matrix Tb2 records original values Rvh-1 to Rvh-S of the same travel parameter Rvh of all the neighbor vehicles #1 to #S obtained at the same sampling time Tsj, as shown in FIG. 7, where h is a positive integer, and h is any one of 1 to x. In step S140, the OBU 110 maps each of the original values Rvh-1 to Rvh-S in the data matrix Tb2 into the CV quantum state to obtain the quantum information.

In some other embodiments, in step S140, the OBU 110 may first perform normalization on each data matrix Tb2 to obtain corresponding normalized values (or accordingly obtain an eigenvector), and then map each normalized value (or the eigenvector) into the CV quantum state to obtain corresponding quantum information. In some embodiments, the normalization may be linear function normalization or zero-mean normalization. An algorithm for the linear function normalization and an algorithm for the zero-mean normalization are well known to a person skilled in the art, and thus details are not described again.

In some embodiments, the linear function normalization is used as an example. The OBU 110 may first determine a value range of the travel parameter Rvh corresponding to the data matrix Tb2, and then linearly map each original value in the data matrix Tb2 into a specified range based on the value range, to obtain corresponding normalized values to accordingly form an eigenvector (P), that is, $P=(\rho_1, \rho_2, \ldots \rho_n)$, where $\rho_1$ represents a probability that a value of the corresponding travel parameter is i. Each normalized value is a nonnegative real number. In some embodiments, the eigenvector P may be represented in a form of a probability distribution, that is, $$\sum_{i-1}^{n} p_i = 1.$$

For example, an example in which the travel parameter Rvh corresponding to the data matrix Tb2 is the speed and the specified range is [0, 1] is used. The OBU 110 confirms that a possible value range of the speed is [0, 120] km/h, and linearly maps each original value in the data matrix Tb2 into [0, 1] by using Formula 1 below:

$$v_{nor} = \frac{v - v_{min}}{v_{max} - v_{min}} \quad \text{Formula 1}$$

Herein, $v$ is the original value of the speed, $v_{min}$ and $v_{max}$ are a minimum value and a maximum value of the speed respectively, and $v_{nor}$ is a mapped normalized value, where the minimum value and the maximum value of the speed form the value range of the speed.

For another example, the positioning coordinates are used as an example, where the positioning coordinates are represented by an x-axis coordinate and a y-axis coordinate. Herein, the positioning coordinates include the x-axis coordinate and the y-axis coordinate, and the x-axis coordinate and the y-axis coordinate are normalized respectively. When the travel parameter Rvh corresponding to the data matrix Tb2 is the x-axis coordinate in the positioning coordinates, the OBU 110 may linearly map each original value in the data matrix Tb2 into [0, 1] by using Formula 2 below:

$$x' = \frac{x - x_{min}}{x_{max} - x_{min}} \quad \text{Formula 2}$$

Herein, x is the original value of the x-axis coordinate, $x_{min}$ and $x_{max}$ are a minimum value and a maximum value of the x-axis coordinate respectively, and x' is a mapped normalized value, where the minimum value and the maximum value of the x-axis coordinate form the value range of the x-axis coordinate.

Therefore, performing the normalization may allow processing and comparison of travel information Pv in different ranges in a same probability space, thereby providing a basis for subsequent quantum state representation.

In some embodiments, the quantum information may be a probability distribution function of a variable obtained without considering quantum properties of superposition and entanglement.

In some embodiments, each data matrix Tb2 (or each eigenvector) may be mapped into a CV quantum state and represented by a probability distribution function (as shown in Formula 3 below). In other words, the OBU 110 may represent the data matrix Tb2 (or each eigenvector) by using Formula 3 below:

$$P(x_{i,j}) = \frac{1}{\sqrt{\pi\sigma^2}} \exp\left(-\frac{(x_{i,j} - \mu)^2}{2\sigma^2}\right) \quad \text{Formula 3}$$

$x_{i,j}$ represents an original value (or a normalized value) of the travel parameter Rvh in an $i^{th}$ row and a $j^{th}$ column in the data matrix Tb2. For example, $x_{i,j}$ represents a speed of the $i^{th}$ vehicle at the $j^{th}$ sampling time (an example in which the travel parameter Rvh is the speed is used).

$P(x_{i,j})$ represents a probability distribution function of $x_{i,j}$. For example, $x_{i,j}$ represents a probability distribution function of the speed of the $i^{th}$ vehicle at the $j^{th}$ sampling time.

$\mu$ represents a mean of all the original values (or normalized values) of the travel parameter in the data matrix Tb2. For example, $\mu$ represents a mean of all speeds recorded in the data matrix Tb2 (the above example is used).

$\sigma$ represents a standard difference of all the original values (or normalized values) of the travel parameter in the data matrix Tb2. For example, $\sigma$ represents a standard difference of all the speeds recorded in the data matrix Tb2 (the above example is used).

Then, the above probability distribution function is quantized to obtain a quantized probability distribution function shown in Formula 4 below.

$$|\varphi\rangle = \int_{-\infty}^{\infty} P(x_{i,j})|x_{i,j}\rangle dx_{i,j} \quad \text{Formula 4}$$

$|\varphi\rangle$ represents the quantum information in the CV quantum state.

$|x_{i,j}\rangle$ represents a quantum state of $x_{i,j}$. For example, $|x_{i,j}\rangle$ represents a quantum state of the speed of the $i^{th}$ vehicle at the $j^{th}$ sampling time (the above example is used).

When the data matrix Tb2 is first processed through the normalization, in a case of representation with the above formula, two-dimensional array information of the travel parameter is mapped to an amplitude of a qubit without using the quantum properties of superposition and entanglement, where the amplitude is not a value but a probability distribution function of a variable in a two-dimensional array.

Refer to FIG. 6. In conventional calculation, S×T element exchange operations are required to calculate a two-dimensional data matrix Tb1 for T travel parameters Rv-1 to Rv-T of (S+1) vehicles 10, with a time complexity of O(S×T). With application of any embodiment, the two-dimensional data matrix may be transposed through quantized data matrix conversion, with a time complexity of O(log 2(S×T)), better than that in conventional calculation.

In some embodiments, after step S140, the OBU 110 may perform change-point detection on all quantum information obtained through conversion (step S150), and generate a corresponding response signal based on each change point detected (step S160).

In some embodiments, the OBU 110 performs change-point detection in step S150 by using a Bayesian method, to calculate abruptness of the quantum state in the sampling time to check a data feature of the travel information Pv. The change-point detection detects a change point of data through similarity comparison between data distributions in two consecutive time periods. In other words, the OBU 110 performs change-point detection on the quantum information to analyze a motion and status of the vehicle 10, for example, predict a future position and speed of the vehicle and detect a traffic congestion.

Figure 8:
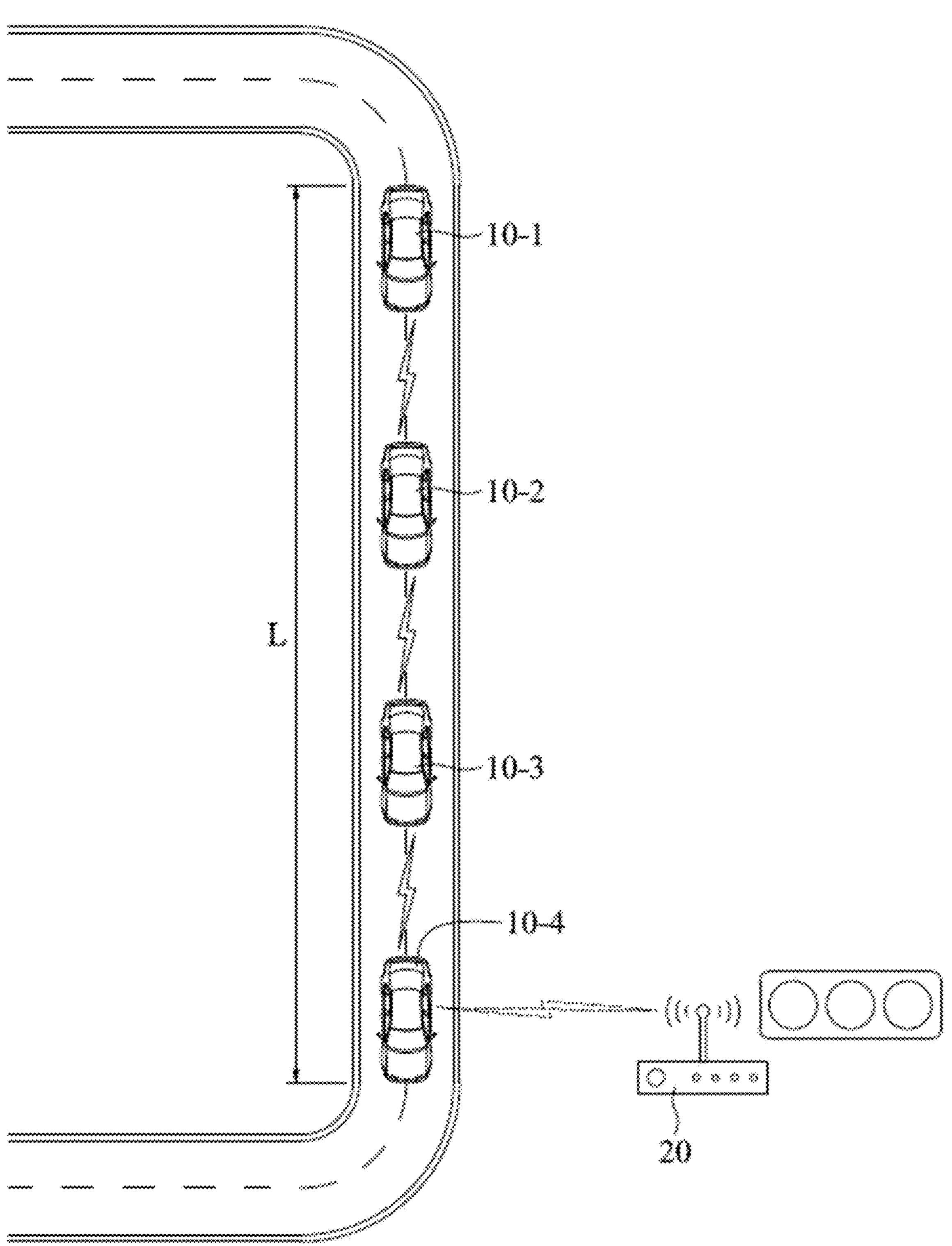
FIG. 8 is a schematic diagram of still another example in which the vehicle condition prediction method in FIG. 1 is used.

For example, refer to FIG. 8. Since efficiency of V2V communication is affected by a distance and a vehicle density, the data feature is checked based on the vehicle density, where the vehicle density may be obtained through a routing distance L and the total number of vehicles, as shown in Formula 5 below.

$$\rho = \frac{k}{L} \quad \text{Formula 5}$$

$\rho$ represents the vehicle density, L represents the routing distance L between a vehicle 10 farthest from the RSU 20 within a signal range of the RSU 20 and the RSU 20, and k represents the total number of vehicles within the routing distance L, where k is a positive integer, and L is a positive real number. For example, as shown in FIG. 7, there are 4 vehicles 10-1 to 10-4 within the routing distance L, that is, k=4.

The change-point detection is performed based on the formula for the vehicle density as shown in Formula 5, where a higher vehicle density indicates a larger number of consecutive time periods of sampling time obtained through division. In other words, a higher vehicle density indicates shorter sampling time and a larger number of sampling times, so that a sampling error is avoided.

In some embodiments, the quantum information is segmented into a plurality of data segments for the change-point detection, and a size of each data segment is determined by the vehicle density. In some embodiments, the OBU 110 first calculates the vehicle density in step S150, to accordingly determine the size of the data segment for the change-point detection. Herein, the OBU 110 first calculates the vehicle density to accordingly determine the number of data segments of the quantum information. A segmentation manner is that a higher vehicle density indicates a larger number of data segments obtained through segmentation.

Then, the OBU 110 updates a posterior probability distribution. The OBU 110 calculates a posterior probability of quantum information at each piece of sampling time by using the Bayesian method when updating the posterior probability distribution.

In some embodiments, the posterior probability may be shown in Formula 6 below.

$$P(\theta \mid D) = \frac{P(D \mid \theta)P(\theta)}{\int P(D \mid \theta)P(\theta)d\theta} \quad \text{Formula 6}$$

D represents data (that is, observed quantum information) observed in the sampling time.

$P(D|\theta)$ represents a probability of occurrence of data D observed in a case of a parameter $\theta$.

$P(\theta)$ represents a prior probability of $\theta$.

$\int P(D|\theta)P(\theta)d\theta$ represents a probability of occurrence of the data D in a case of all possible parameters.

It is assumed that the quantum information is extracted from different probability distributions within each piece of sampling time. Specifically, the OBU 110 calculates the posterior probability distribution by using the Bayesian method, and perform comparison by using the posterior probability distribution, to determine whether data distributions of quantum information at two pieces of sampling time are similar. If the data distributions at the two pieces of sampling time are different, the OBU 110 considers that a data change point (that is, a change point) is between the two pieces of sampling time.

After obtaining the posterior probability, the OBU 110 calculates an abruptness index. When calculating the abruptness indicator, the OBU 110 determines, based on the prior probability and the posterior probability, a change point representing the abruptness. In some embodiments, the prior probability is a Gaussian distribution, or a specified value defined by experience before use. For example, the specified value is determined by a past posterior probability.

For example, the speed of the vehicle 10 is detected. The OBU 110 can find, through the change-point detection, a speed feature from quantum information of the speed at consecutive sampling time, for example, an abrupt change in the speed (that is, an abrupt increase or abrupt decrease, where a decrease indicates a congestion, and an increase indicates that traffic gets smooth). In this case, transmit power of the travel information Pv may be automatically adjusted to adapt to a topological change based on a distance between a data amount of the traffic information Pv and a node, and another factor. For example, a vehicle in front is braked or abruptly decelerated, a speed feature in the vehicle neighbor table changes abruptly (that is, a speed decrease), a distance between vehicles usually decreases, and the OBU 110 generates a response signal, such that a warning indicator (for example, a display or a speaker) warns with system information. In another example, the OBU 110 may generate a response signal, such that the wireless transceiver 115 reduces a transmission speed to increase a transmission success rate. In still another example, the OBU 110 may generate a response signal, such that a navigation module reselects an optimal routing for the vehicle 10 to travel along, or the current vehicle 10*a* adjusts an autonomous driving speed to adapt to a new topological trend, ensuring higher security and higher efficiency in a driving process.

In an example, it is assumed that there are 5 vehicles 10 (a vehicle 1 to a vehicle 5) within a 1000-meter section (this range is determined by a range in which a signal of the RSU can be received). At sampling time 1, a speed of the vehicle 1 is 96 km/h, a speed of a vehicle 2 is 100 km/h, a speed of a vehicle 3 is 90 km/h, a speed of a vehicle 4 is 96 km/h, and a speed of the vehicle 5 is 95 km/h. At sampling time 2, the speed of the vehicle 2 abruptly decreases from 100 km/h to 0 km/h.

In this case, for the sampling time 1, a vehicle neighbor table for the vehicle 1 records the speeds of the other 4 vehicles 10, as shown in Table 1.

TABLE 1

| | Travel parameter Rv | |
|---|---|---|
| Neighbor vehicle | Vehicle identity | Speed (km/h) |
| #1 | 02 | 100 |
| #2 | 03 | 90 |
| #3 | 04 | 96 |
| #4 | 05 | 95 |

For the sampling time 2, a vehicle neighbor table for the vehicle 1 records the speeds of the other 4 vehicles 10, as shown in Table 2.

TABLE 2

| | Travel parameter Rv | |
|---|---|---|
| Neighbor vehicle | Vehicle identity | Speed (km/h) |
| #1 | 02 | 0 |
| #2 | 03 | 90 |
| #3 | 04 | 96 |
| #4 | 05 | 95 |

In this example, there are the 5 vehicles within the 1000-meter section. In this case, the 1000-meter section may be divided into 5 equilong intervals of which each is 200 meters long. Therefore, the OBU 110 calculates the vehicle density to be 5/1000=0.005 vehicle per meter.

In addition, the OBU 110 maps original values of the speeds in Table 1 and Table 2 into a CV quantum state of 0 to 100, and stores a data value (x) of the speed of the $i^{th}$ vehicle 10 at the $j^{th}$ sampling time to the probability distribution function ($P(x_{i,j})$). The specified range is 0 to 100, and the value range is 0 km/h to 100 km/h, where 0 km/h and 100 km/h are the minimum value and the maximum value of the speed respectively.

Then, the OBU 110 confirms the prior probability. In an example, the prior probability may use an empirical value obtained by using the vehicle density. For example, when the vehicle density is 0.005 vehicles per meter, a mean speed is 96 km/h. In another example, it is assumed that each vehicle is within each segment, and the OBU 110 determines speed data in each data interval as a value of a prior probability distribution, and calculates a mean speed in each data interval, to obtain mean speeds in the data intervals to be 96 km/h, 100 km/h, 90 km/h, 96 km/h, and 95 km/h respectively.

Next, the OBU 110 updates the posterior probability distribution by using a Bayes theorem, to reflect a probability that the speed abruptly changes. In this example, the speed of the vehicle 2 abruptly decreases from 100 km/h to 0 km/h, and speed distributions at two pieces of adjacent sampling time may be different.

Finally, the OBU 110 observes abruptness of the probability distribution function in the CV quantum state by determining, through comparison, whether a difference between the prior probability and the posterior probability is greater than an index. In this example, if the speed of the vehicle 2 abruptly decreases from 100 km/h to 0 km/h, the posterior probability decreases greatly, which may be considered as the abruptness.

In this example, there are the 5 vehicles within the 1000-meter section. Therefore, the vehicle density is 5/1000=0.005 vehicles per meter. If there are 10 vehicles within the 1000-meter section. In this case, the 1000-meter section may be divided into 10 equilong intervals of which each is 100 meters long. Therefore, the vehicle density is 10/1000=0.01 vehicles per meter. The density of 0.01 vehicles per meter is higher than the density of 5/1000=0.005 vehicle per meter, which indicates that the routing distance L of the travel information Pv is short and there are many continuous quantum states. In a case of a high vehicle density and a dynamic topology, it is very complicated to calculate a matrix eigenvalue. 2 pieces of sampling time are used as an example, to simplify description. The vehicle neighbor table is a 4×2 data matrix, and the data matrix is transposed through quantized data matrix conversion, with a time complexity of $O(\log 2(2^{4\times 2}))$.

In some embodiments, the OBU 110 has a processor 111. The processor 111 is connected to the sensor 113, the wireless transceiver 115, and a memory 116. The processor 111 is configured to perform step S110 to step S160. The processor 111 is wirelessly connected to the memory 116 through the wireless transceiver 115 that can be configured to store a program such as software or firmware, a material, data, a combination thereof, or the like involved when the processor 111 performs step S110 to step S160.

In addition, the CV quantum state-based vehicle condition prediction method according to any embodiment may be implemented by a computer program product, such that step S110 to step S160 can be performed when the OBU 110 loads and executes at least one program. In some embodiments, the computer program product may be a non-transitory computer-readable recording medium, and the program is stored in the non-transitory computer-readable recording medium for the OBU 110 to load. In some embodiments, the program may be a computer program product, and is transmitted to the OBU 110 in a wired or wireless manner.

In summary, according to the CV quantum state-based vehicle condition prediction method or a vehicle condition prediction system according to any embodiment, the travel information Pv is described by the CV quantum state. In this way, the change-point detection is performed during high-speed and changing information transmission, and abruptness of data serves as the basis for subsequent transmission and processing rules. Therefore, V2V transmission capabilities are improved. In some embodiments, according to the CV quantum state-based vehicle condition prediction method or the vehicle condition prediction system, a data transmission process is described by a CV, which, compared with a discrete representation method, can describe a data transmission status within the routing distance L between each vehicle 10 and the RSU 20 more elaborately. In some embodiments, according to the CV quantum state-based vehicle condition prediction method or the vehicle condition prediction system, the sampling time of the V2V data is described by the CV quantum state, so that features are extracted by using statistical characteristics of big data, and a correlation between data at different sampling points (that is, sampling time) on a time sequence is maintained.

What is claimed is:

1. A continuous-variable (CV) quantum state-based vehicle condition prediction method, comprising:

constructing, based on travel information of a plurality of vehicles, at least one data matrix that records vehicle conditions of the plurality of vehicles;

converting the at least one data matrix into quantum information represented by a CV quantum state;

performing a change-point detection on all of the quantum information represented by the CV quantum state; and generating a corresponding response signal based on each change point obtained through the change-point detection, to control operation of at least one in-vehicle system of a current vehicle in the plurality of vehicles.

2. The CV quantum state-based vehicle condition prediction method according to claim 1, wherein the travel information of each of the plurality of vehicles comprises at least one travel parameter of the vehicle, and each of the at least one travel parameter is a speed of the vehicle, any coordinate data in positioning coordinates of the vehicle, a course of the vehicle, or chassis data of the vehicle.

3. The CV quantum state-based vehicle condition prediction method according to claim 1, further comprising:

receiving the travel information of at least one surrounding vehicle in the plurality of vehicles through a vehicular ad-hoc network (VANET); and obtaining the travel information of the current vehicle in the plurality of vehicles by using at least one sensor, wherein the at least one sensor is mounted on the current vehicle.

4. The CV quantum state-based vehicle condition prediction method according to claim 3, wherein the step of constructing, based on the travel information of the plurality of vehicles, the at least one data matrix that records the vehicle conditions of the plurality of vehicles comprises:

integrating travel parameters of the plurality of vehicles at a plurality of pieces of sampling time based on the travel information of the current vehicle and the travel information of the at least one surrounding vehicle, to accordingly form the at least one data matrix for a neighbor vehicle at different sampling time.

5. The CV quantum state-based vehicle condition prediction method according to claim 4, wherein the step of converting the at least one data matrix into the quantum information represented by the CV quantum state comprises:

performing normalization on the at least one data matrix to obtain an eigenvector; and mapping the eigenvector into the CV quantum state to obtain the quantum information.

6. The CV quantum state-based vehicle condition prediction method according to claim 5, wherein the normalization is linear function normalization or zero-mean normalization.

7. The CV quantum state-based vehicle condition prediction method according to claim 5, wherein the travel information of each of the plurality of vehicles comprises at least one travel parameter of the vehicle, the at least one data matrix is constructed by using original values of a same travel parameter of the plurality of vehicles, and the step of performing the normalization on the at least one data matrix to obtain the eigenvector comprises:

determining a value range of the travel parameter;

linearly mapping the plurality of original values into a specified range based on the value range, to obtain a plurality of normalized values, wherein the plurality of normalized values are all nonnegative real numbers; and forming the eigenvector by using the plurality of normalized values.

8. The CV quantum state-based vehicle condition prediction method according to claim 5, wherein the quantum information is a probability distribution function of a variable obtained without considering quantum properties of superposition and entanglement.

9. The CV quantum state-based vehicle condition prediction method according to claim 8, wherein the probability distribution function of the variable is $$|\varphi\rangle = \int_{-\infty}^{\infty} P(x_{i,j})|x_{i,j}\rangle dx_{i,j},$$

wherein $|\varphi\rangle$ represents the quantum information in the CV quantum state, $x_{i,j}$ represents a normalized value of the travel parameter of an $i^{th}$ vehicle in the plurality of vehicles at $j^{th}$ sampling time in the plurality of pieces of sampling time, $P(x_{i,j})$ represents a probability distribution function of $x_{i,j}$, $|X_{i,j}\rangle$ represents a quantum state of $x_{i,j}$, i is a positive integer, j is a positive real number, and the probability distribution function of $x_{i,j}$ is $$P(x_{i,j}) = \frac{1}{\sqrt{\pi\sigma^2}}\exp\left(-\frac{(x_{i,j}-\mu)^2}{2\sigma^2}\right).$$

10. The CV quantum state-based vehicle condition prediction method according to claim 1, wherein the travel information of each of the plurality of vehicles comprises at least one travel parameter of the vehicle, each of the at least one data matrix is constructed by using original values of a same travel parameter of the plurality of vehicles, and the step of converting the at least one data matrix into the quantum information represented by the CV quantum state comprises:

mapping each of the original values in the at least one data matrix into the CV quantum state to obtain the quantum information.

11. The CV quantum state-based vehicle condition prediction method according to claim 10, wherein the quantum information is a probability distribution function of a variable obtained without considering quantum properties of superposition and entanglement.

12. The CV quantum state-based vehicle condition prediction method according to claim 11, wherein the probability distribution function of the variable is $$|\varphi\rangle = \int_{-\infty}^{\infty} P(x_{i,j})|x_{i,j}\rangle dx_{i,j},$$

wherein $|\varphi\rangle$ represents the quantum information in the CV quantum state, $x_{i,j}$ represents an original value of the travel parameter of an $i^{th}$ vehicle in the plurality of vehicles at $j^{th}$ sampling time in the plurality of pieces of sampling time, $P(x_{i,j})$ represents a probability distribution function of $x_{i,j}$, $|X_{i,j}\rangle$ represents a quantum state of $x_{i,j}$, i is a positive integer, j is a positive real number, and the probability distribution function of $x_{i,j}$ is $$P(x_{i,j}) = \frac{1}{\sqrt{\pi\sigma^2}}\exp\left(-\frac{(x_{i,j}-\mu)^2}{2\sigma^2}\right).$$

13. The CV quantum state-based vehicle condition prediction method according to claim 1, wherein the step of performing the change-point detection on all of the quantum information comprises:

calculating a posterior probability of the quantum information at each piece of sampling time by using a Bayesian method; and determining, based on a prior probability and the posterior probability, a change point representing abruptness.

14. The CV quantum state-based vehicle condition prediction method according to claim 13, wherein the quantum information is segmented into a plurality of data segments for the change-point detection, and a size of each data segment is determined by a vehicle density of the plurality of vehicles.

15. The CV quantum state-based vehicle condition prediction method according to claim 13, wherein the prior probability is a specified value, and the specified value is determined by a past posterior probability.

16. The CV quantum state-based vehicle condition prediction method according to claim 1, wherein the travel information of each surrounding vehicle in the plurality of vehicles is carried in a vehicle-to-vehicle (V2V) message.

17. A non-transitory computer-readable recording medium, storing at least one program, such that an on board unit (OBU) loads and executes the at least one program to implement the CV quantum state-based vehicle condition prediction method according to claim 1.

18. A vehicle condition prediction system, comprising:

a processor, configured to construct, based on travel information of a plurality of vehicles, at least one data matrix that records vehicle conditions of the plurality of vehicles, convert the at least one data matrix into quantum information represented by a CV quantum state, performing a change-point detection on all of the quantum information represented by the CV quantum state, and generating a corresponding response signal based on each change point obtained through the change-point detection to control operation of at least one in-vehicle system of a current vehicle in the plurality of vehicles.

19. The vehicle condition prediction system according to claim 18, further comprising:

a wireless transceiver, connected to the processor and configured to perform wireless communication with at least one surrounding vehicle in the plurality of vehicles through a VANET; and at least one sensor, connected to the processor and configured to sense the travel information of the current vehicle in the plurality of vehicles;

wherein the processor is further configured to receive the travel information of the at least one surrounding vehicle in the plurality of vehicles by using the wireless transceiver, and obtain the travel information of the current vehicle in the plurality of vehicles by using the at least one sensor.

* * * * *